United States Patent
Marino et al.

(10) Patent No.: US 12,468,829 B2
(45) Date of Patent: Nov. 11, 2025

(54) ENTERPRISE DATA CONTAINER

(71) Applicant: Microsoft Technology Licensing, LLC, Redmond, WA (US)

(72) Inventors: Peter J. Marino, Seattle, WA (US); Michael Adam Taft, Seattle, WA (US); Brian M. Mahaffey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 18/326,387

(22) Filed: May 31, 2023

(65) Prior Publication Data

US 2024/0403459 A1    Dec. 5, 2024

(51) Int. Cl.
*G06F 21/62* (2013.01)
*G06F 21/60* (2013.01)
*G06F 21/64* (2013.01)

(52) U.S. Cl.
CPC ........ *G06F 21/6209* (2013.01); *G06F 21/602* (2013.01); *G06F 21/64* (2013.01)

(58) Field of Classification Search
CPC ..... G06F 21/6209; G06F 21/602; G06F 21/64
See application file for complete search history.

(56) References Cited

U.S. PATENT DOCUMENTS

| | | | | |
|---|---|---|---|---|
| 5,812,793 | A * | 9/1998 | Shakib | H04L 67/1095 709/201 |
| 11,386,041 | B1 * | 7/2022 | Gillani | G06F 16/24573 |
| 2010/0263060 | A1 | 10/2010 | Charbonneau et al. | |
| 2015/0278520 | A1 * | 10/2015 | Mraz | G06F 21/567 726/23 |
| 2017/0093753 | A1 | 3/2017 | Summers | |
| 2017/0111331 | A1 | 4/2017 | Auradkar et al. | |
| 2019/0132049 | A1 | 5/2019 | Cai et al. | |
| 2023/0359550 | A1 * | 11/2023 | Muthiah | G06F 12/0246 |

FOREIGN PATENT DOCUMENTS

CN    106339362 A    1/2017

OTHER PUBLICATIONS

"NewsML-G2 Guidelines", Retrieved From: https://iptc.org/std/NewsML-G2/guidelines/, Oct. 10, 2020, 272 Pages.
"Types of Avro Schema Formats", Retrieved From: https://docs.informatica.com/data-integration/powerexchange-cdc-publisher/1-3/user-guide/appendix-b--avro-schema-formats/types-of-avro-schema-formats.html, Dec. 15, 2022, 2 Pages.
International Search Report and Written Opinion received for PCT Application No. PCT/US2024/030162, Sep. 2, 2024, 13 pages.

* cited by examiner

*Primary Examiner* — Ayoub Alata

(57) ABSTRACT

Examples of the present disclosure describe systems and methods for an enterprise data container (EDC) that facilitates the secure transfer of data between data boundaries of one or more computing environments. In examples, the EDC serves as a message wrapper for transmitted data. The EDC includes metadata, identification, tracking, security attributes, authenticity, and handling caveats relevant to the operational constraints of one or more computing environments through which data is transferred. The EDC is computing environment agnostic and agnostically manages the data wrapped in the EDC.

20 Claims, 5 Drawing Sheets

ENTERPRISE DATA CONTAINER

BACKGROUND

Enterprise data management (EDM) enables organizations to define, integrate, and disseminate data for internal and external communications. In many organizations, EDM presents challenges related to document security, extension, and authenticity. Although organizations have attempted solutions to address these challenges, such solutions are typically implemented in a proprietary form that is constrained to a particular computing environment. As such, a solution implemented in one organization or computing environment will generally not be applicable to or functional in another organization or computing environment.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for an enterprise data container (EDC) that facilitates the secure transfer of data between data boundaries of one or more computing environments. In examples, the EDC serves as a message wrapper for transmitted data. The EDC includes metadata, identification, tracking, security attributes, authenticity, and handling caveats relevant to the operational constraints of one or more computing environments through which data is transferred. The EDC is computing environment agnostic and agnostically manages the data wrapped in the EDC.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
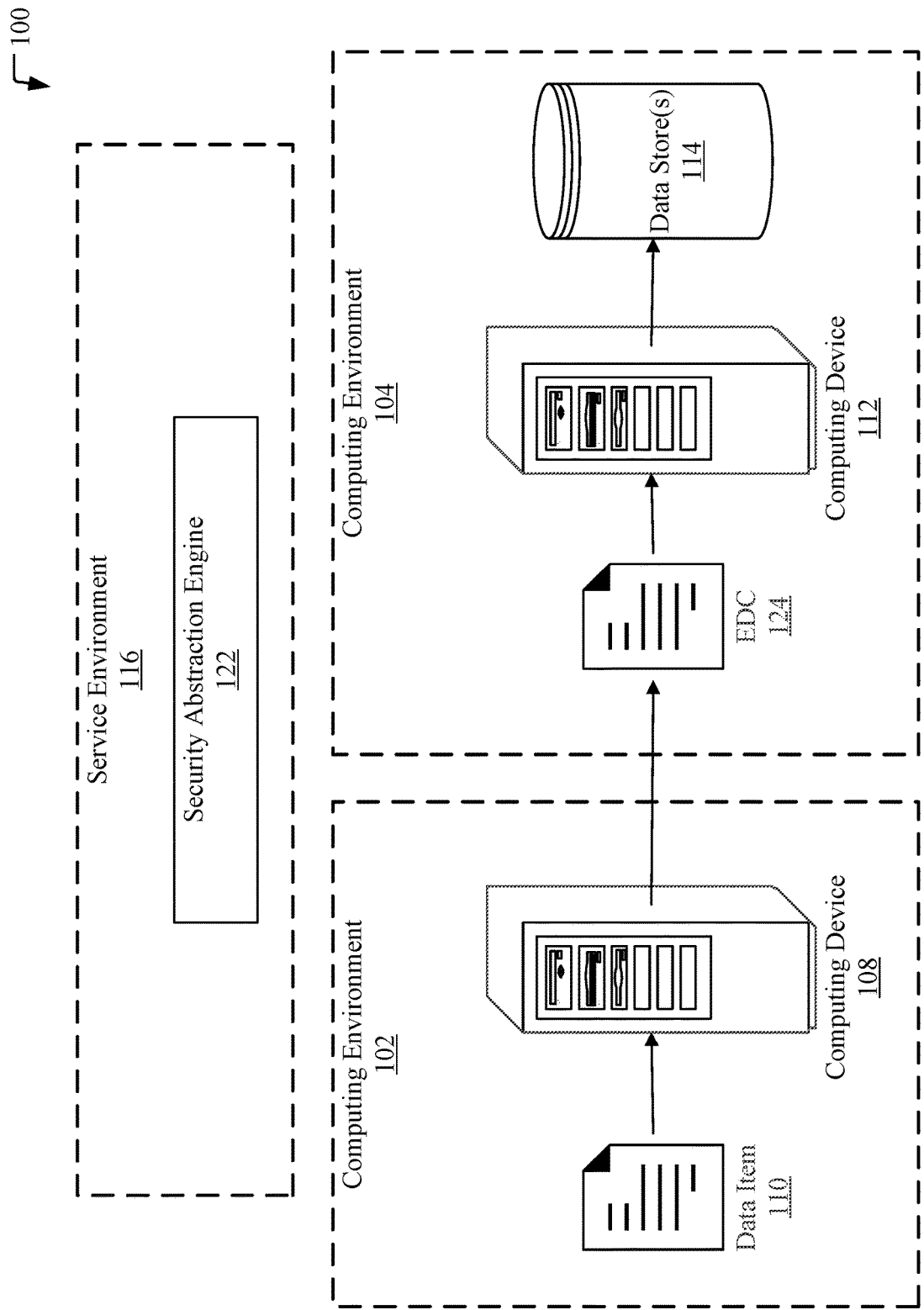
FIG. 1 illustrates an example system for implementing an EDC that facilitates the secure transfer of data between data boundaries of one or more computing environments.

As discussed above, EDM enables entities (e.g., organizations, enterprises, groups, individuals) to manage data for internal and external communications. Although many entities have adopted EDM solutions for securely storing and transmitting data owned or controlled by those entities, those solutions are proprietary in nature and are generally not applicable to or functional in the computing environments of other entities. In some cases, the solutions are not even functional in other computing environments of the same entity. As such, the security and data handling policies applied to data in one computing environment are not enforced when that data is transmitted to another computing environment. The lack of consistent enforcement of security and data handling policies provides opportunities for bad actors to access or modify transmitted data and forces each entity that receives transmitted data to apply its own security rules and policies to the data. The lack of consistent enforcement also prevents data and data usage from being tracked across computing environments. For example, some EDM solutions prevent a computing environment from accessing or having visibility into other computing environments that are beyond a data boundary of the computing environment. Accordingly, a computing environment is unable to monitor or receive status information on data transmitted to other computing environments.

The present disclosure provides a solution to the above-described deficiencies of previous EDM solutions. Embodiments of the present disclosure describe systems and methods for an enterprise data container (EDC) that facilitates the secure and trackable transfer of data items between data boundaries of one or more computing environments. In examples, the EDC is a hierarchical data structure that serves as a message wrapper or otherwise provides message wrapper functionality for transmitted data items. A message wrapper refers to a data structure that encapsulates ("wraps") one or more data items (e.g., documents, files, streaming data) in order to convert data associated with a data item to a normalized format and/or to abstract the complexity of the data item. The EDC wraps one or more data items and corresponding information for the data items, such as metadata, handling information, attributes, and signatures.

The content of the data item (e.g., the actual payload of the data item) is represented in the EDC using, for example, structured formats, binary formats, and/or external references. Structured formats are encoded in a representation matching the representation of the EDC. For example, if the EDC is specified in an extensible markup language (XML) representation, the content of the data item is encoded in XML. Binary formats are used to encode data items in non-text content and to encode nested content. For example, a Base64 encoding scheme may be used to convert to binary content to XML content. External references enable the metadata and attributes of a data item to be stored in the EDC while the content of the data item is persisted in an external data store. For example, a Uniform Resource Locator (URL) or a Uniform Resource Name (URN) may be used to reference the content of the data item.

The metadata (also referred to as "natural" metadata) includes a unique identifier for a data item or for one or more objects within or associated with the data item (e.g., paragraphs, images, charts, or file sections within or linked to the data item). The unique identifier is generated by the EDC and serves as a global or enterprise-level identifier that is applicable beyond the context of an originating service or application used to create the data item. For example, when a data item is generated by a first service, the first service assigns a service-specific identifier to the data item. The service-specific identifier is not applicable to other services outside of the first service. For instance, the service-specific identifier cannot be used to access or identify the data item at a second service that has received the data item and the second service does not use or recognize the service-specific identifier. In contrast, the unique identifier generated by the EDC is applicable beyond the context of the originating service and enables the data item to be tracked as the data item is transmitted between computing environments. For instance, each computing environment that receives the EDC may identify the data item by the unique identifier. In one example, the unique identifier is a dataflow identifier that is associated with a use case describing a user objective or a specific scenario for the dataflow. For instance, the EDC may be used to wrap a data item that is to be transmitted in a dataflow from a first computing environment to a second computing environment. In some examples, the metadata also includes a creation data that specifies the date and/or time the EDC was created or applied to a data item, as opposed to specifying the date and/or time the data item was created.

The handling information includes requirements for processing, transporting, or accessing a data item within (wrapped by) the EDC. For example, handling information may indicate a data classification for a data item (e.g., restricted, sensitive, public), an access requirement for a data item (e.g., a user security level, a user role or title, user involvement in a project or an assignment, an expertise level on a particular topic), or an expiration policy for a data item (e.g., a time or event occurrence after which the data item is deleted or becomes inaccessible). In examples, the handling information is defined or provided using access control policies (e.g., attribute-based access control (ABAC) policies, role-based access control (RBAC), environment policies, time/date policies, system control policies) or handling policies (e.g., validity period policies, disposition policies, transport constraint policies, cache directive policies). The EDC may comprise handling information for each computing environment through which the EDC is transmitted or is intended to be transmitted. For instance, a first set of policies in the handling information may be applicable to a low-security computing environment along a transmission path of the EDC and a second set of policies in the handling information may be applicable to a high-security computing environment along the transmission path. The data boundary enforcement mechanisms used by each computing environment then interpret the corresponding policies to ensure the data item is transferred and processed appropriately.

The attributes include or represent information in or relating to the data item, such as "natural" metadata (as discussed above) or "derived" metadata of the data item. Derived metadata represents information that is associated with a data item, but is not natively included (e.g., encoded or embedded) in the data item. For example, although a data item is generated in a particular location, the location is not included in the natural metadata of the data item. As a result, a geolocation tag may be added to an attribute of the EDC to provide additional context that was not available natively within the original data item. As such, the EDC enables additional attributes to be associated with a data item, thereby providing a means to extend the data definition of the data item. In some examples, the attributes also include or represent information related to the transport or storage of the data item (e.g., routing information, address information, file system information, computing environment information). The attributes may be represented in key-value strings or complex structured information.

The signature includes information related to the integrity of the data item and the authenticity of the data item sender. In examples, the signature represents or is represented by secured data, such as hashes and cryptographic assertions. For instance, an authoring environment (e.g., an environment used to author a data item) cryptographically signs the data item and applies a corresponding digital signature to the EDC. The digital signature maintains the integrity of the content in the data item and the identity of the original author, the current owner, or a current possessor of the data item. The EDC is transmitted to a receiving environment, which evaluates the digital signature to determine that the data item originated from the authoring environment and has not been impermissibly altered during transmission.

In examples, the EDC is computing environment agnostic in that the EDC is implementable across multiple operating environments, platforms, programming languages, and operating systems and does not differentiate based on the computing environment in which the EDC is currently located. The EDC provides a uniform interface and a consistent format that can be relied on and leveraged by various computing environments. In some examples, the EDC can be parsed using an "off-the-shelf" parsing utility, such as an XML parser. Additionally, the EDC agnostically manages data items within the EDC. For example, the EDC does not attempt to interpret the data items within the EDC or to enforce the rules and policies provided in the handling information. Instead, the EDC encapsulates the data item (regardless of the type, format, or content of the data item) and enables the computing environments to interpret and process the data item using the data item information included in the EDC (e.g., metadata, handling information, attributes, and signatures), as discussed above.

FIG. 1 illustrates an example system for implementing an EDC that facilitates the secure transfer of data between data boundaries of one or more computing environments. System 100, as presented, is a combination of interdependent components that interact to form an integrated whole. Components of system 100 may be hardware components or software components (e.g., APIs, modules, runtime libraries) implemented on and/or executed by hardware components of system 100. In one example, components of system 100 are distributed across multiple processing devices or computing systems.

In FIG. 1, system 100 enables transmitting data between different computing environments of one or more entities. In some examples, system 100 represents a one-way transfer (OWT) system, which facilitates the unidirectional transfer of data across one or more data boundaries of the OWT system. An OWT system refers to a computing system in which one or more endpoints are data diodes configured to ensure that data packets can be transferred only unidirectionally through the computing system. In many cases, OWT systems are used to protect a network or endpoints against outbound data transmissions, malicious inbound data transmissions (e.g., viruses and malware), and cyberattacks. As one example, OWT systems facilitate the transfer of data between computing environments having the same or different security levels (e.g., high-security or low-security), where at least one of the computing environments is low-trust with respect to another of the computing environments. For instance, a first computing environment that is high-trust with respect to the devices of the first computing environment and/or with respect to devices of one or more other computing environments may receive data from a second computing environment that is considered to be low-trust by the first computing environment.

In examples, a high-trust environment refers to a system or network where the devices, applications, and users are considered trustworthy, and security measures are in place to establish and maintain that trust. In this type of environment, the devices and/or parties involved, such as devices, software, and users, are often authenticated, authorized, and/or adhere to established security policies and best practices. High-trust environments usually have rigorous access controls, encryption, and monitoring to ensure that trust is maintained and to minimize the risk of unauthorized access, data breaches, or other security incidents. Devices within high-trust environments may be authorized to access or be accessed by other devices based on security techniques that are implemented by the high-trust environments (e.g., unique encryption keys, secrets, or other cryptographical techniques). For instance, the communications transmitted by a high-trust environment may be considered trustworthy by other computing environments or devices based on the high-trust environment (or devices thereof) being included in an allowlist (e.g., a list of approved devices and/or computing environments). Alternatively, the communications transmitted by a high-trust environment may be considered trustworthy based on a password or credential provided with the communications. In some examples, the devices in a high-trust environment do not require authentication to access or be accessed by other devices. A high-trust environment generally does not expose the security techniques implemented by the high-trust environment to other computing environments, which may be considered low-trust or no-trust environments by the high-trust environment.

By contrast, a low-trust or no-trust environment refers to a system or network where the devices, applications, and/or users are not implicitly trusted or where there is a high risk of unauthorized access or malicious activities. Low-trust or no-trust environments may have limited or no security measures in place, or may include or be connected to one or more external or unmanaged devices. Alternatively or additionally, a low-trust or no-trust environment refers to an environment in which the devices are not considered to be secured or trustworthy by other devices within and/or external to the low-trust or no-trust environments. As the security techniques implemented by the high-trust environment are not exposed to low-trust or no-trust environments, low-trust or no-trust environments may not be able to access or communicate with a high-trust environment without performing various authorization and/or authentication steps that need not be performed by devices in high-trust environments. In examples, an OWT system may span or include multiple computing environments that are separated by one or more boundaries between computing environments of different trust levels and/or security levels.

System 100 comprises computing environments 102 and 104 and service environment 116. In examples, computing environments 102 and 104 are implemented in a cloud computing environment or another type of distributed computing environment and are subject to one or more distributed computing models/services (e.g., Infrastructure as a Service (IaaS), Platform as a Service (PaaS), Software as a Service (SaaS), Functions as a Service (FaaS)). Computing environments 102 and 104 may be implemented by one or more entities. For instance, computing environments 102 and 104 may be implemented by the same organization or enterprise. Alternatively, computing environments 102 and 104 may each be implemented by a different organization or enterprise. In some examples, service environment 116 is implemented locally in one or more of computing environments 102 and 104. For instance, one or more computing devices in computing environments 102 and/or 104 may each comprise a separate instance of service environment 116. In other examples, service environment 116 is implemented separately from one or more of computing environments 102 and 104. For instance, service environment 116 may be implemented in a cloud computing environment that is remotely accessible by computing environments 102 and/or 104 via a network, such as a private area network (PAN), a local area network (LAN), or a wide area network (WAN).

Although FIG. 1 is depicted as comprising a particular combination of computing environments and devices, the scale and structure of devices and computing environments described herein may vary and may include additional or fewer components than those described in FIG. 1. Further, although examples in FIG. 1 and subsequent figures will be described in the context of OWT systems and data transfers between low-security computing environments and high-security computing environments, the examples are equally applicable to non-OWT systems and data transfers between computing environments of various (or the same) types and security levels. Moreover, the examples are equally applicable data transfers between components of a single device. For instance, an EDC may be used to transmit data items from a low-security container (e.g., software data structures for storing data and data objects) of a single device to a high-security container of the single device.

In examples, computing environment 102 represents a low-security computing environment in which devices executing within computing environment 102 are not trusted by devices executing within computing environment 104. In such examples, computing environment 102 may be physically separated from computing environment 104 such that computing environment 102 is in a first physical location (e.g., region, building, room, or rack) and computing environment 104 is in a different second physical location. Alternatively, computing environment 102 and computing environment 104 may share the same physical location.

Computing environment 102 comprises computing device 108. Examples of computing device 108 include data diodes and server devices, such as web servers, file servers, application servers, and database servers. Computing device 108 receives input, such as data item 110, from users or computing devices within or accessible to computing environment 102. Data item 110 may represent one or more documents, files, or streaming data and may comprise or request one or more types of data (e.g., audio data, touch data, text-based data, gesture data, and/or image data) or computing instructions (e.g., commands or operations).

In response to receiving data item 110, computing device 108 may access service environment 116. In examples, service environment 116 provides access to various computing services and resources (e.g., applications, devices, storage, processing power, networking, analytics, intelligence). In FIG. 1, service environment 116 comprises security abstraction engine 122. Security abstraction engine 122 is a software engine that abstracts security controls of hardware components that have traditionally been dedicated for policy enforcement. In some examples, security abstraction engine 122 applies a set of policies to data item 110. Applying the set of policies includes executing one or more operations associated with the first set of policies on data item 110. Each operation may be a set of executable instructions that is executed by security abstraction engine 122 serially or in parallel with other operations. The set of policies includes policies that dictate the data content and types of data that may be provided to and/or received from computing environments 102 and 104. The set of policies may be retrieved from a policy repository or a policy service in or accessible to service environment 116.

Figure 2:
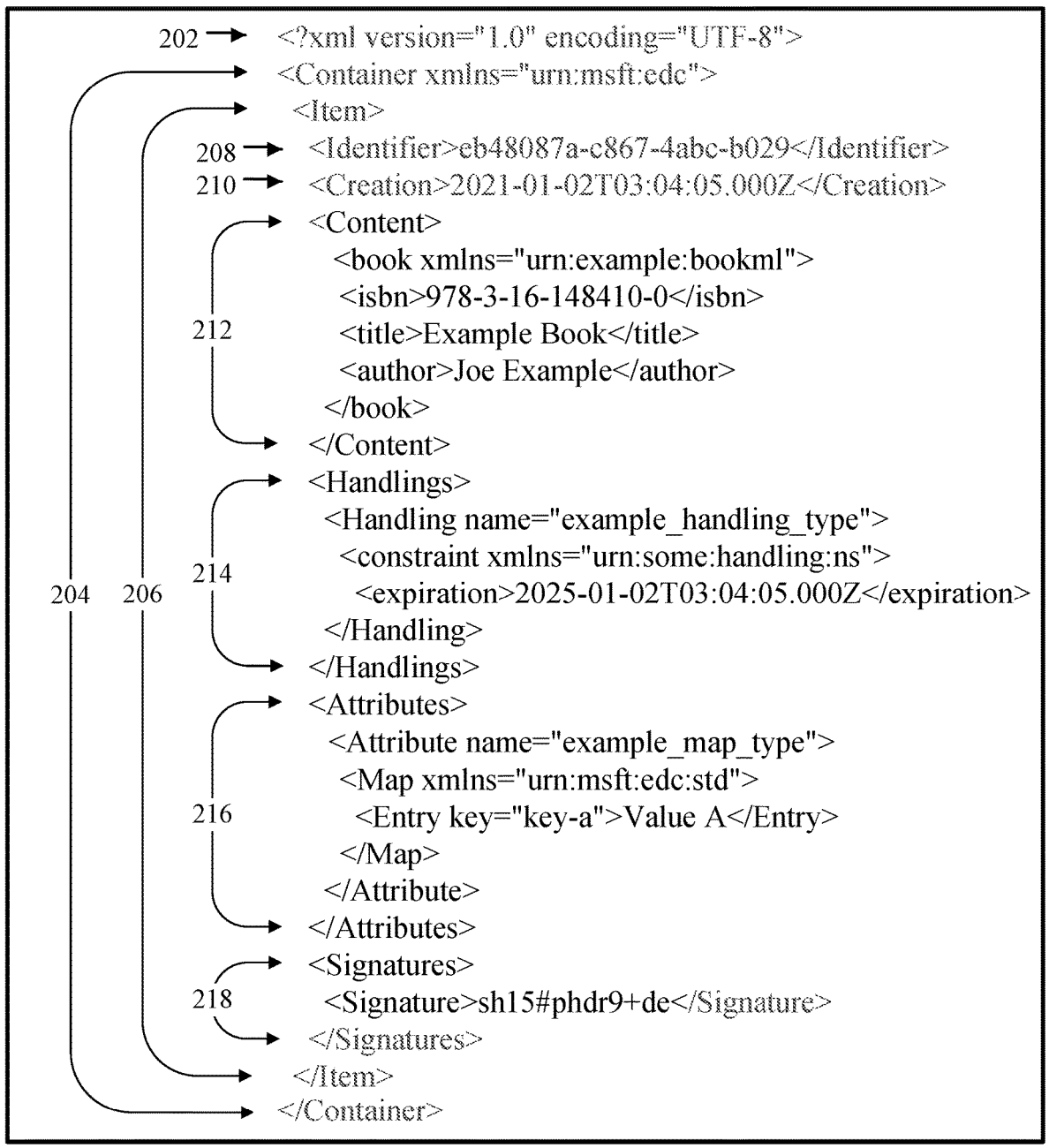
FIG. 2 illustrates an example format for an EDC.

Security abstraction engine 122 applies EDC 124 to data item 110 to secure transfer of data item 110 between computing environment 102 and computing environment 104. Security abstraction engine 122 applies EDC 124 using a wrapper mechanism (e.g., a wrapper function or a similar wrapper utility). The wrapper mechanism is integrated into security abstraction engine 122 or is otherwise accessible via service environment 116 or computing environment 102. In some examples, the wrapper mechanism generates EDC 124 (or an instance of EDC 124). In other examples, the wrapper mechanism selects EDC 124 from a group of one or more preexisting EDCs. In at least one example, the wrapper mechanism provides a serialized representation of data item 110 and corresponding information for data item 110 (e.g., metadata, handling information, attributes, and signatures). For instance, data item 110 is serialized (e.g., formatted) in XML format such that the content of the data item and the corresponding information for data item 110 are arranged hierarchically using nested element tags. FIG. 2, discussed below, illustrates an example serialized representation of data item 110.

In examples, security abstraction engine 122 generates the corresponding information for data item 110 and/or retrieves the corresponding information for data item 110 from one or more data sources. As one example, upon (or as part of) EDC 124 being applied to data item 110, security abstraction engine 122 generates a unique identifier for data item 110 and records an EDC creation timestamp. Alternatively, the EDC generates a unique identifier for data item 110. The unique identifier and EDC creation timestamp are applied (e.g., inserted) as attributes of EDC 124. As another example, security abstraction engine 122 generates or retrieves handling information for data item 110 based on a set of policies associated with data item 110. For instance, a set of policies applied to data item 110 by security abstraction engine 122 may specify handling information for computing environments 102 and 104 (e.g., data classifications that can be sent and received, access requirements for each computing environment, authorized recipients or storage locations, expiration policies). Security abstraction engine 122 may apply the handling information applicable to computing environments 102 and 104 as attributes of EDC 124. As yet another example, security abstraction engine 122 derives metadata for data item 110. For instance, security abstraction engine 122 may access a separate service or system within or external to system 100 to retrieve a metadata property for data item 110 (e.g., creation geolocation, creation date, data classification). Security abstraction engine 122 applies the derived metadata as attributes of EDC 124. As still yet another example, security abstraction engine 122 retrieves a signature associated with computing environment 102 or a sender of data item 110. Alternatively, security abstraction engine 122 generates a signature for data item 110 upon EDC 124 being applied to data item 110. Security abstraction engine 122 applies the signature as an attribute of EDC 124.

In FIG. 1, computing device 108 provides EDC 124 to computing device 112. In other embodiments, security abstraction engine 122 provides EDC 124 to computing device 112 or to a security abstraction engine 122 associated with computing environment 104. In examples, computing environment 104 represents a higher-security computing environment with respect to computing environment 102. Computing environment 104 comprises computing device 112 and data store(s) 114. Examples of computing device 112 include those devices described above with respect to computing device 108. In some examples, computing device 112 is located proximate to computing device 108 (e.g., in the same building or room). For instance, computing device 112 and computing device 108 may be located in the same room of a data center such that computing device 108 is located in a first data rack (e.g., server rack or data cabinet) and the computing device 112 is located in a second data rack or a different shelf of the first data rack. In such an example, computing device 112 and computing device 112 may be directly connected via point-to-point cabling. In other examples, computing device 112 is located remotely from computing device 108 (e.g., in a different building or room).

Computing device 112 transmits EDC 124 to data store(s) 114. Examples of data store(s) 114 include direct-attached storage devices (e.g., hard drives, solid-state drives, and optical disk drives), network-based storage devices (e.g., storage area network (SAN) devices and network-attached storage (NAS) devices), and other types of memory devices. Data store(s) 114 receive and store EDC 124. In some examples, data store(s) 114 provide EDC 124 to a destination endpoint or to another device that facilitates delivery of EDC 124 to a destination endpoint. Although data store(s) 114 are depicted as being located within computing environment 104, one or more of data store(s) 114 may be located externally to computing environment 104. For instance, one or more of data store(s) 114 may be located in a separate computing environment of system 100 or in a computing environment external to system 100.

FIG. 2 illustrates an example format for an EDC. Example EDC 200 is similar in form and functionality to EDC 124. EDC 200 is presented as a hierarchical data structure that serves as a message wrapper for one or more data items, such as data item 110. In FIG. 2, the hierarchical data structure corresponds to an XML representation of EDC 200. Although an XML representation is illustrated, alternative representation types are contemplated, such as JavaScript Object Notation (JSON) and Protocol Buffers (Protobuf) native binary encoding.

Representation tag 202 comprises information relating to the representation format of EDC 200. In examples, the information corresponds to a representation declaration that includes the version of the representation and a character encoding format. Container tags 204 comprise a data item and provide information relating to objects within a scope of container tags 204. For instance, container tags 204 includes a namespace for EDC 200. Item tags 206 comprise content of a data item and corresponding information of the data item. Identifier tag 208 provides a unique identifier for a data item within EDC 200. The unique identifier serves as a global or enterprise-level identifier that is applicable beyond the context of an originating service or application used to create the data item. For instance, the unique identifier can be used by an external tracking service (e.g., a service external to a system or computing environment used to transmit EDC 200) to track the pedigree of a data item across various data boundaries. Creation tags 210 provides a timestamp indicating a time EDC 200 was created or applied to a data item.

Content tags 212 comprise the content of a data item and/or natural metadata of the data item. For example, content tags 212 include a URN for a book and natural metadata for the book, such as International Standard Book Number (ISBN), title, and author. Handlings tags 214 comprise handling information for a data item. For example, handlings tags 214 include a handling caveat name, a handling constraint namespace, and a handling constraint (e.g., a specific expiration date/time for the book). Attributes tags 216 comprise natural and/or derived metadata for a data item. For example, attributes tags 216 include an attribute name for a map schema, a map schema namespace, and an entry of a key-value pair. Signatures tags 218 comprise integrity and/or authenticity information relating to the data item. For example, signatures tags 218 include a digital signature that ensures the integrity of the content in the book and the identity of the owner or possessor of the data item.

Having described a system that may be employed by the embodiments disclosed herein, a method that may be performed by such systems is now provided. Although method 300 is described in the context of system 100 of FIG. 1 and EDC 200 of FIG. 2, the performance of method 300 is not limited to such examples.

Figure 3:
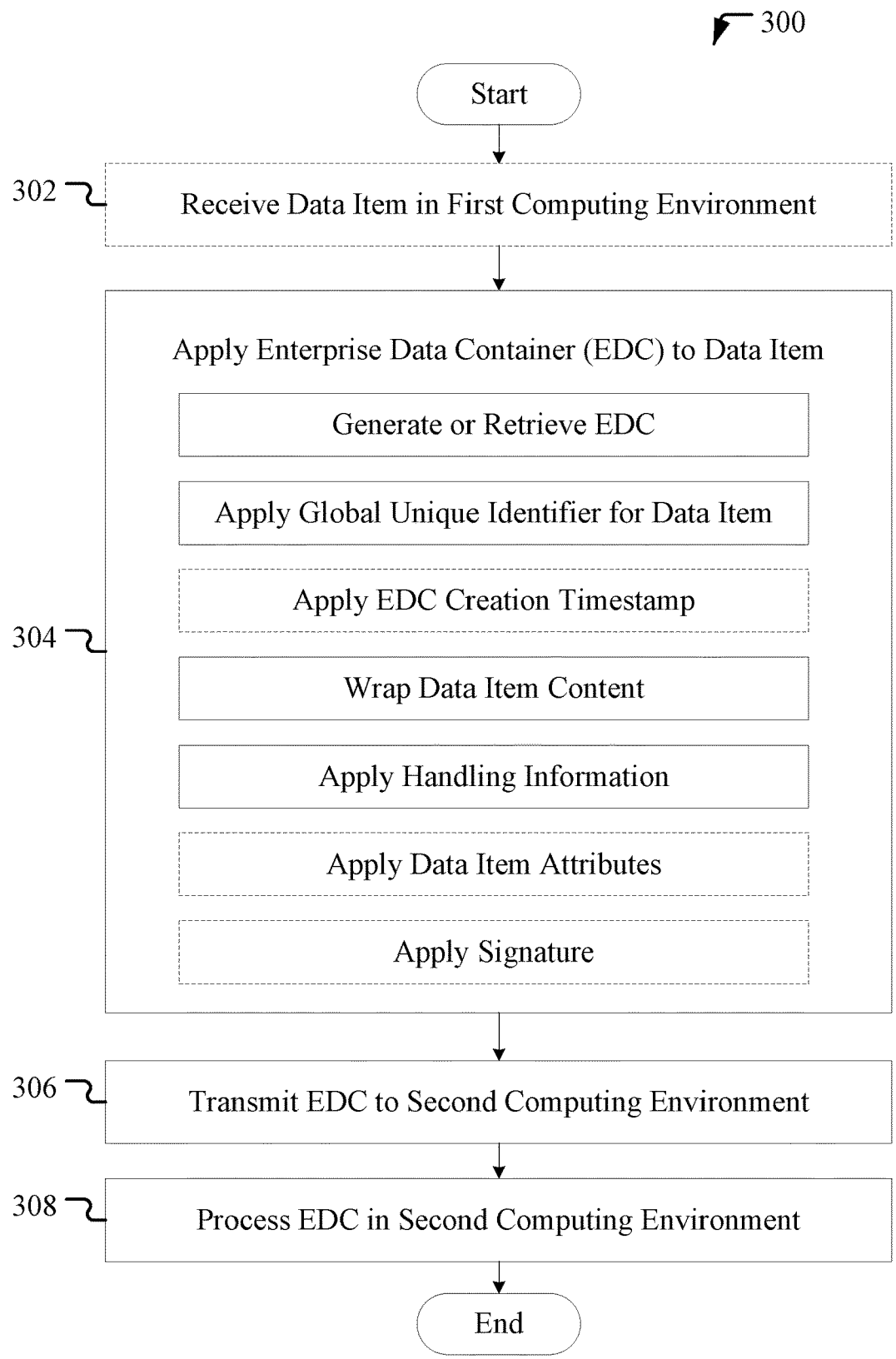
FIG. 3 illustrates an example method for applying an EDC to a data item to be transferred between computing environments.

FIG. 3 illustrates a method 300 for applying an EDC to a data item to be transferred between computing environments. In examples, one or more of the computing environments differ in security level or physical location. For instance, one of the computing environments may be a low-security environment and another of the computing environments may be a high-security environment. In one example, the computing environments are implemented in an OWT system through which the EDC is to be transmitted.

Method 300 begins at optional operation 302, where a data item, such as data item 110, is received in a first computing environment, such as computing environment 102. The data item originates at a source endpoint in the first computing environment, or the data item is provided to the first computing environment from an external source endpoint. The data item may include structured content, binary content, and/or referenced content. As an example, the data item may be image file that is generated by an image capture device in a location external to the first computing environment. The image capture device transmits the image file to the first computing environment as part of a secure data transfer request by an operator of the image capture device. Alternatively, the image file is transmitted to the first computing environment automatically (e.g., in accordance with a prescheduled data synchronization process). In examples, the data item comprises natural metadata, such as an identifier or name (e.g., an image capture device-level identifier), a creation date, an author or creator, or a file size. The natural metadata may be embedded in the data item, appended to the data item, or otherwise associated with the data item.

At operation 304, an EDC is applied to the data item. In examples, the EDC is applied to the data item by a policy component of or accessible to the first computing environment, such as security abstraction engine 122. The policy component generates the EDC (or an instance of the EDC) or retrieves the EDC from a group of one or more preexisting EDCs. The policy component may generate or retrieve the EDC in response to identifying a set of policies to be applied to the data item, applying the set of policies to the data item, or receiving the data item. The policies may be retrieved from a policy repository or a policy service in or accessible to the first computing environment. In examples, applying the EDC comprises generating a global or enterprise-level unique identifier for the data item, where the unique identifier is applicable beyond the context of an originating service or application used to create the data item. The unique identifier and/or a creation timestamp indicating a time the EDC was created or applied to the data item are then applied (e.g., inserted) as attributes of the EDC. For instance, element tags, such as identifier tag 208 and creation tags 210, are inserted into the EDC.

Applying the EDC also comprises enclosing the content of the data item in the EDC and applying handling information, attributes, and/or a signature for the data item to the EDC. As one example, the content of the data item may be wrapped (e.g., enclosed) in element tags, such as content tags 212. The element tags for the content of the data item may include natural metadata for the data item. The EDC may include multiple data items of the same or various types and the content of each data item may be separately enclosed in the EDC. As another example, handling information that provides policies for processing, transporting, or accessing a data item within the EDC is applied to the EDC. The handling information includes policies for each computing environment through which the EDC is transmitted. The handling information may be accompanied by attributes of the data item (e.g., natural metadata and derived metadata) and/or a signature associated with the first computing environment or with the owner or possessor of the data item. The handling information, the attributes, and the signature are applied as attributes of the EDC. For instance, element tags, such as handlings tags 214, attributes tags 216, and signatures tags 218 are inserted into the EDC. As such, the EDC effectively extends the definition of the data item with additional content (e.g., the attributes of the EDC) that is not natively included in the data item.

At operation 306, the EDC is transmitted to a second computing environment, such as computing environment 104. In some examples, the policy component transmits the EDC to the second computing environment using routing information for the data item. In other examples, another component in the first computing environment transmits the EDC to the second computing environment. The routing information may be collected from a data structure (e.g., a data table, data array, or a data mapping) that stores correlations between destination identifiers (e.g., an identifier of a destination device or component in the second computing environment or in another computing environment) and respective sets of policies and/or source identifiers (e.g., an identifier of a source device or component that provided the data item to the first computing environment). The destination identifiers and source identifiers may correspond to an Internet Protocol (IP) address, a Media Access Control (MAC) address, a Uniform Resource Locator (URL), a device port, or the like. In some examples, the routing information is included in the EDC as derived attributes of the data item or as part of the handling information.

At operation 308, the second computing environment processes the EDC. In examples, processing the EDC comprises receiving the EDC at a data boundary enforcement mechanism of the second computing environment, such as a firewall, a router, or a policy enforcement service. The data boundary enforcement mechanism evaluates the EDC to determine whether the EDC comprises handling information for the data item that is applicable to the second computing environment. For instance, the data boundary enforcement mechanism may identify and/or retrieve policies for accessing and transmitting the data item in the second computing environment. The policies may be retrieved from a policy repository or a policy service in or accessible to the second computing environment. In one example, the policy repository or the policy service includes policies applicable to the first computing environment and policies applicable to the second computing environment. The data boundary enforcement mechanism then enforces the handling information that is applicable to the second computing environment. In examples, enforcing the handling information for the second computing environment comprises executing policies for the data item or accessing the data item within the EDC in accordance with the policies. For instance, the data boundary enforcement mechanism may remove (e.g., unwrap) the EDC from the data item and execute the data item or provide the data item to a location in the second computing environment. Alternatively, the data boundary enforcement mechanism may not access or interpret the data item. Instead, the data boundary enforcement mechanism may transmit the EDC to a destination in the second computing environment or to a third computing environment based on routing information in the EDC.

In some examples, the EDC comprises attributes enabling the EDC to be tracked as the EDC is transmitted between computing environments. For instance, a data boundary enforcement mechanism (or an alternative component) for each computing environment that received the EDC transmits the unique identifier applied to the EDC to a tracking system that is implemented in a service environment, such as service environment 116, or is implemented externally to the first and second computing environments. The tracking system records each computing environment from which a unique identifier is received. The tracking system may also record usage metrics of the data item in each computing environment. For instance, the tracking system may record access information (e.g., number of access attempts, date/time of accesses, identity of accessors), modification information (e.g., modifications to data item content or metadata), and storage information (e.g., storage locations, number of stored instances of the data item, storage policies) associated with the data item. As such, the tracking system is able to track the pedigree and/or usage of the data item across multiple computing environments.

Figure 4:
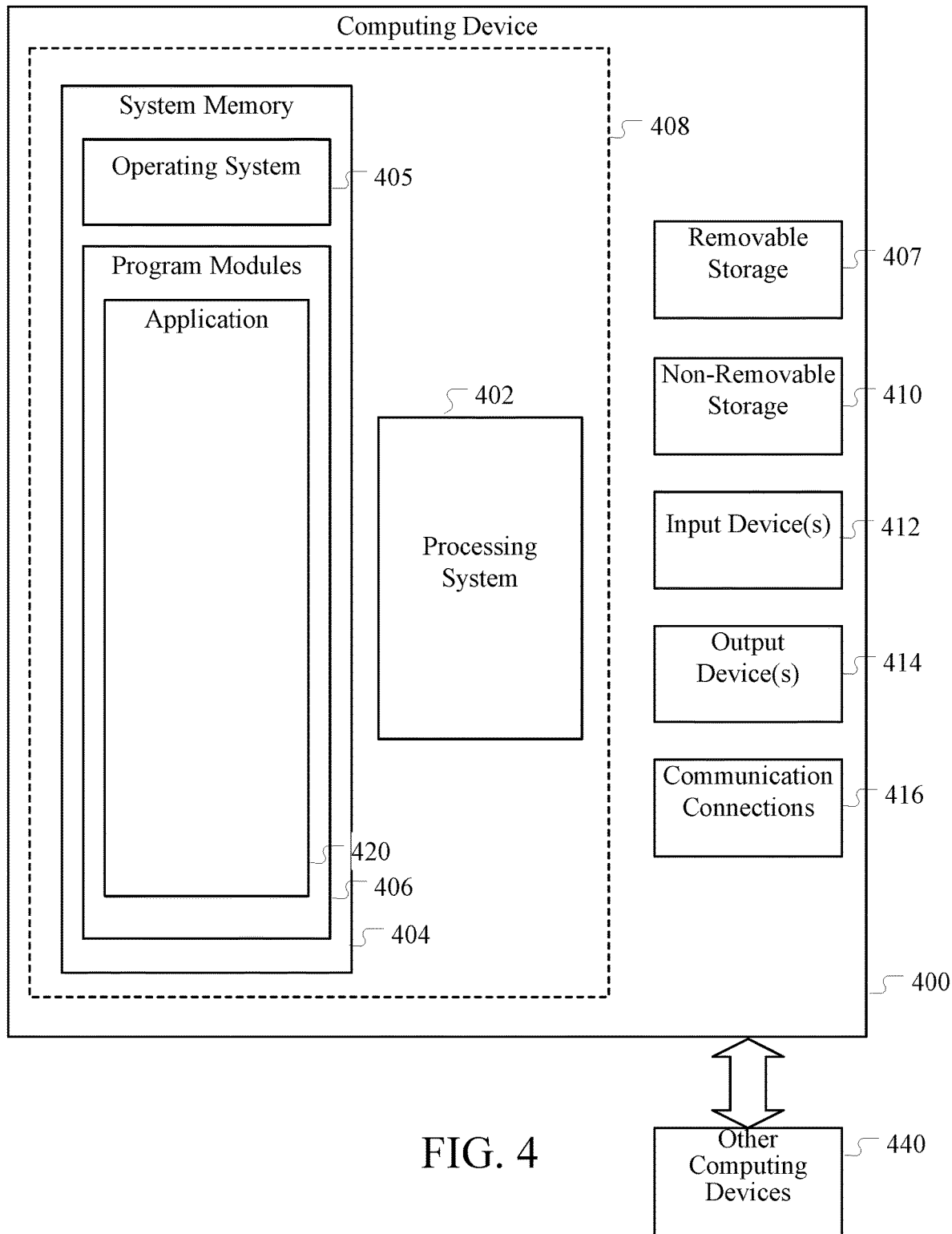
FIG. 4 is a block diagram illustrating example physical components of a computing device for practicing aspects of the disclosure.
Figure 5:
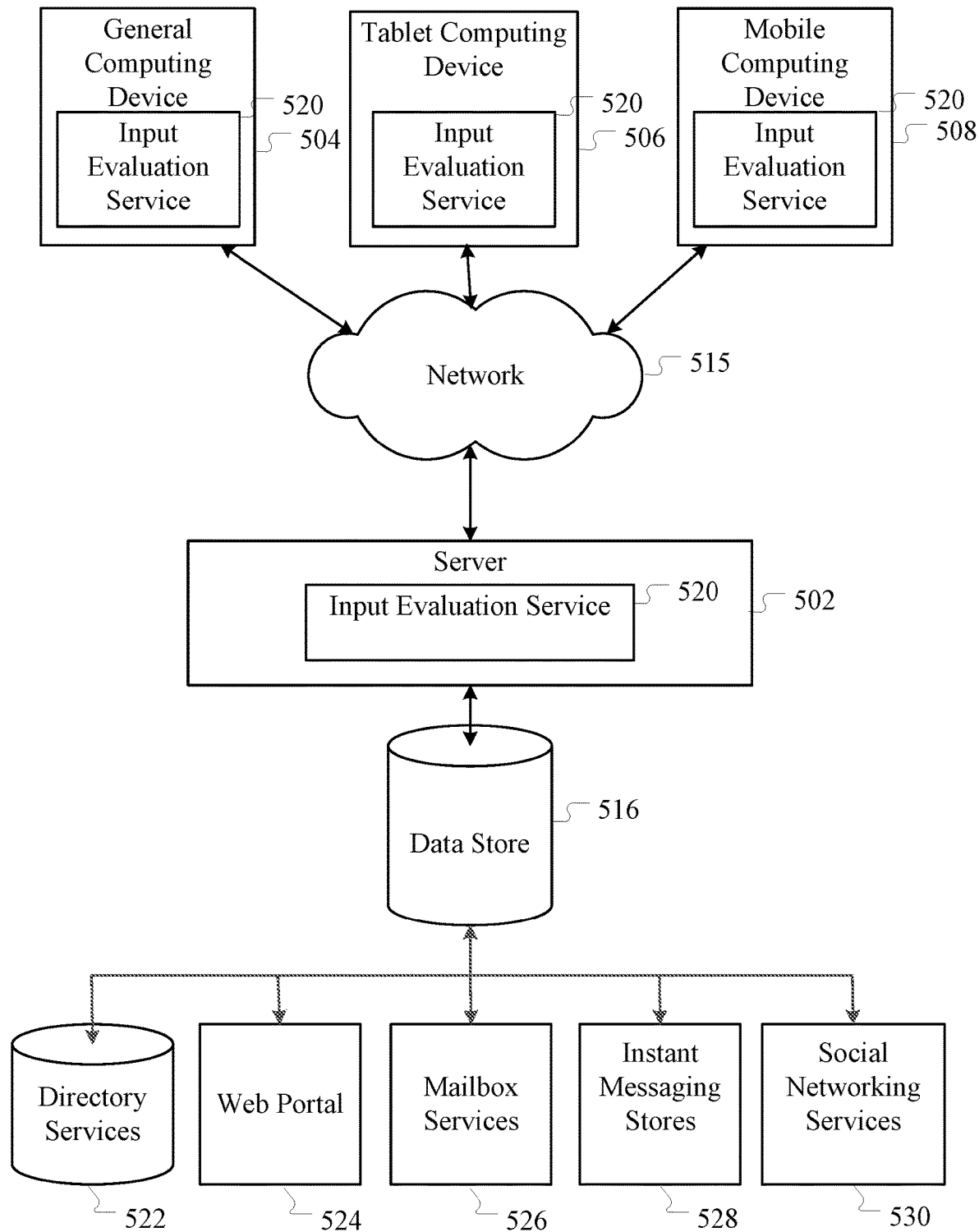
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing system 402 and a system memory 404. Depending on the configuration and type of computing device, the system memory 404 comprises volatile storage (e.g., random access memory (RAM)), non-volatile storage (e.g., read-only memory (ROM)), flash memory, or any combination of such memories.

The system memory 404 includes an operating system 405 and one or more program modules 406 suitable for running software application 420, such as one or more components supported by the systems described herein. The operating system 405, for example, is suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, or optical disks. Such additional storage is illustrated in FIG. 4 by a removable storage device 407 and a non-removable storage device 410.

As stated above, a number of program modules and data files may be stored in the system memory 404. While executing on the processing system(s) 402, the program modules 406 (e.g., application 420) may perform processes including the aspects described herein. Other program modules that may be used in accordance with aspects of the present disclosure include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality described herein with respect to the capability of a client to switch protocols, may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 also has one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 provides data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

As will be understood from the present disclosure, one example of the technology discussed herein relates to a system comprising: a processing system; and memory coupled to the processing system, the memory comprising computer executable instructions that, when executed, perform operations comprising: applying an enterprise data container (EDC) to a data item in a first computing environment, wherein applying the EDC comprises: inserting a global identifier into the EDC, the global identifier being generated by the EDC and being applicable beyond a context of an originating service used to create the data item; inserting data content of the data item into the EDC; inserting handling information into the EDC, the handling information indicating a first policy for processing the data item in the first computing environment and a second policy for processing the data item in a second computing environment that is separated from the first computing environment by a data boundary; inserting an attribute of the data item into the EDC, the attribute being associated with metadata of the data item; and inserting a digital signature into the EDC, the digital signature being used to validate integrity of the data item; and transmitting the EDC to the second computing environment to be processed by the second computing environment in accordance with the second policy.

In another example, the technology discussed herein relates to a method comprising: applying an enterprise data container (EDC) to a data item in a first computing environment, wherein applying the EDC comprises: inserting a global identifier into the EDC, the global identifier being generated by the EDC; inserting content of the data item into the EDC; inserting handling information into the EDC, the handling information indicating a first policy for transmitting or accessing the data item in the first computing environment and a second policy for transmitting or accessing the data item in a second computing environment; and inserting a cryptographically signed data into the EDC, the cryptographically signed data associated with an owner or a possessor of the data item; processing the EDC in the first computing environment in accordance with the first policy; and transmitting the EDC to the second computing environment to be processed by the second computing environment in accordance with the second policy.

In another example, the technology discussed herein relates to a device comprising: a processing system; and memory comprising computer executable instructions that, when executed, perform operations comprising: inserting a global identifier into an enterprise data container (EDC) applied to a data item, the global identifier being generated for the data item by the EDC; inserting content of the data item or a representation of the content into the EDC; inserting handling information into the EDC, the handling information including: a first policy associated with a first computing environment, the first policy providing first access controls and handling controls for interacting with the data item in the first computing environment; and a second policy associated with a second computing environment, the second policy providing access second controls and handling controls for interacting with the data item in the second computing environment; and transmitting, in accordance with first policy, the EDC from the first computing environment to the second computing environment to be processed by the second computing environment in accordance with the second policy.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, it is envisioned that variations, modifications, and alternate aspects fall within the spirit of the broader aspects of the general inventive concept embodied in this application do not depart from the broader scope of the claimed disclosure.

What is claimed is:

1. A system comprising:
a processing system; and
memory comprising computer executable instructions that, when executed, perform operations comprising:
receiving, by a security abstraction engine of a first computing environment, an enterprise data container (EDC) based on a set of policies associated with a data item;
applying, by the security abstraction engine of the first computing environment, the EDC to the data item in the first computing environment, wherein applying the EDC comprises:
inserting a global identifier into the EDC, the global identifier being generated by the EDC and being applicable beyond a context of an originating service used to create the data item;
inserting data content of the data item into the EDC;
inserting handling information into the EDC, the handling information indicating a first policy for processing the data item in the first computing environment and a second policy for processing the data item in a second computing environment that is separated from the first computing environment by a data boundary;
inserting an attribute of the data item into the EDC, the attribute being associated with metadata of the data item; and
inserting a digital signature into the EDC, the digital signature being used to validate integrity of the data item; and
transmitting, by the security abstraction engine, the EDC to the second computing environment to be processed by the second computing environment in accordance with the second policy.

2. The system of claim 1, wherein the first computing environment and the second computing environment are implemented in a one-way transfer (OWT) system.

3. The system of claim 1, wherein:
the EDC is a wrapper for the data item; and
the global identifier, the data content, the handling information, the attribute, and the digital signature are inserted into the EDC as attributes of the EDC.

4. The system of claim 1, wherein the EDC is applied to the data item by a policy enforcement mechanism implemented in a service environment accessible to the first computing environment.

5. The system of claim 1, wherein applying the EDC further comprises:
inserting a creation timestamp into the EDC, the creation timestamp indicating a time the EDC is applied to the data item.

6. The system of claim 1, wherein the data content is accompanied by natural metadata for the data item, the natural metadata including at least one of:
a data item identifier;
a data item creation date;
a data item author; or
a data item size.

7. The system of claim 1, wherein:
applying the EDC further comprises transmitting the global identifier to an external tracking service; and
transmitting the EDC to the second computing environment comprises transmitting the global identifier to the external tracking service, the global identifier being used to track the EDC across the first computing environment and the second computing environment.

8. The system of claim 1, wherein the handling information comprises at least one of:
a data classification for the data item;
an access requirement for the data item; or
an expiration policy for the data item.

9. The system of claim 1, wherein the attribute corresponds to derived metadata for the data item, the derived metadata not being natively included in the data item.

10. The system of claim 9, wherein the derived metadata comprises at least one of:
routing information;
address information;
file system information; or
computing environment information.

11. The system of claim 1, wherein the digital signature:
is generated by a sender of the data item; and
is further used to validate authenticity of the sender.

12. The system of claim 1, wherein the EDC:
is computing environment agnostic; and
agnostically manages the data item.

13. The system of claim 1, wherein the EDC does not interpret or enforce the first policy or the second policy.

14. The system of claim 1, wherein the EDC does not natively include the handling information or the global identifier.

15. A method comprising:
receiving, by a security abstraction engine of a first computing environment, an enterprise data container (EDC) based on a set of policies associated with a data item;
applying, by the security abstraction engine of the first computing environment, the EDC to the data item in a first computing environment, wherein applying the EDC comprises:
inserting a global identifier into the EDC, the global identifier being generated by the EDC;
inserting content of the data item into the EDC;
inserting handling information into the EDC, the handling information indicating a first policy for transmitting or accessing the data item in the first computing environment and a second policy for transmitting or accessing the data item in a second computing environment; and
inserting a cryptographically signed data into the EDC, the cryptographically signed data associated with an owner or a possessor of the data item;
processing the EDC in the first computing environment in accordance with the first policy; and
transmitting, by the security abstraction engine, the EDC to the second computing environment to be processed by the second computing environment in accordance with the second policy.

16. The method of claim 15, wherein the EDC is a hierarchical data structure.

17. The method of claim 15, wherein the first computing environment is a low-security environment and the second computing environment is a higher-security environment with respect to the first computing environment.

18. The method of claim 15, wherein applying the EDC comprises:
generating derived metadata for the data item from information in a data source external to the first computing environment, the derived metadata not being natively included in the data item; and
inserting the derived metadata into the EDC.

19. The method of claim 15, wherein the cryptographically signed data is used in the second computing environment to validate the content of the data item has not been modified during transmission of the EDC between the first computing environment and the second computing environment.

20. A device comprising:
- a processing system; and
- memory comprising computer executable instructions that, when executed, perform operations comprising:
    - inserting, by a security abstraction engine of a first computing environment, a global identifier into an enterprise data container (EDC) applied to a data item, the global identifier being generated for the data item by the EDC, the security abstraction engine receiving the EDC based on a set of policies associated with the data item;
    - inserting content of the data item or a representation of the content into the EDC;
    - inserting handling information into the EDC, the handling information including:
        - a first policy associated with the first computing environment, the first policy providing first access controls and handling controls for interacting with the data item in the first computing environment; and
        - a second policy associated with a second computing environment, the second policy providing access second controls and handling controls for interacting with the data item in the second computing environment; and
    - transmitting, in accordance with first policy, the EDC from the first computing environment to the second computing environment to be processed by the second computing environment in accordance with the second policy.

* * * * *